United States Patent Office 2,986,834
Patented June 6, 1961

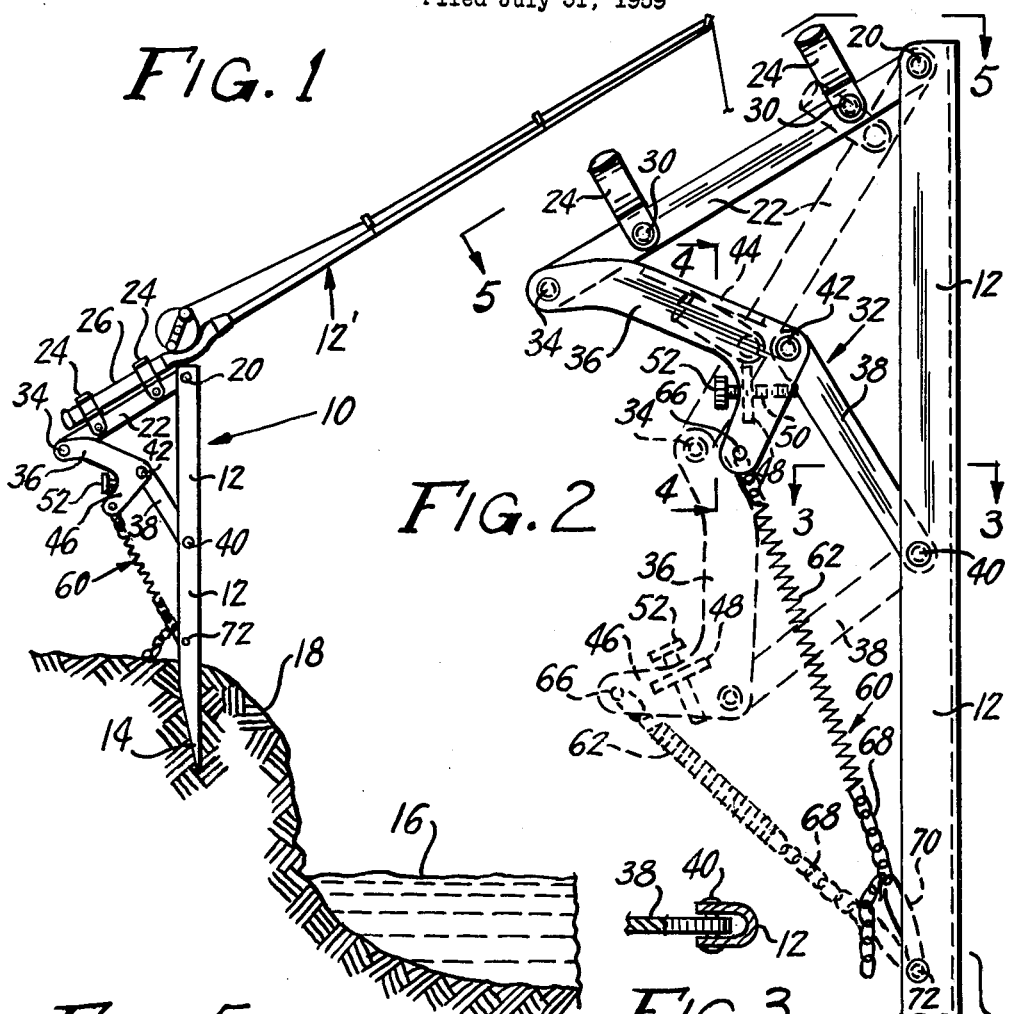

2,986,834
AUTOMATIC HOOK-SETTING FISHING ROD HOLDER
John P. Irwin, Burlington, Kans.
(1431 Topeka Blvd., Topeka, Kans.)
Filed July 31, 1959, Ser. No. 830,955
3 Claims. (Cl. 43—15)

This invention relates to a toggle-actuated automatic hook-setting fishing rod holder, and has for an object to provide a holder to which a fishing rod can be detachably secured, which holder would operate, when a fish bites on the hook at the end of the fishing line, to automatically whip the end of the fishing rod upwardly and thus cause the line to set the hook in the fish securely, and thereafter, maintain a yieldable tension on the line and thus prevent the fish from readily disengaging itself, particularly during times when the rod is unattended.

A further object of this invention is to provide a fishing rod holder which will permit the fish hook to remain hanging in the water to a desired depth, but which will, immediately that there is a bite on the fish hook, whip up the end of the fishing line, setting the hook in the fish and then holding the line under yieldable tension to resist any efforts of the fish to escape.

Still a further object of this invention is to provide a fishing rod holder which may preferably be inserted in the ground, but just as obviously, could be fastened in any suitable manner so as to remain upright, and which has a toggle-actuated lever on which the fishing rod is detachably secured so that the toggle permits the rod to remain stationary until a fish has pulled on the fishing line, and thus actuate the toggle beyond dead center position, whereupon a biasing means on the toggle will pull the toggle substantially beyond dead center in an accelerating action, to whip the end of the fishing rod up and set the hook in the fish, thereafter yieldably playing the fishing rod as the fish attempts to escape the hook.

Still a further object of this invention is to provide a fishing rod holder, wherein a fishing rod is firmly yet easily detachably secured to a lever pivoted to an upright and held in position by an adjustable toggle, with a tension means permitting the toggle to remain in stationary off-center position until the action of the fish has moved it to beyond dead center position, whereupon the tension means accelerates a whipping action of the fishing rod to set the hook and hold the fish line under tension against the action of the fish until the rod can be picked up by the fisherman to land the fish.

A further object of this invention is to provide a fishing rod holder made up of a few, comparatively inexpensive parts, easily manufactured and assembled at low cost so that a fisherman can well afford to use several of them, and thus fish from several fishing rods simultaneously yet, due to the substantial movement of the fishing rod mounted thereon, will quickly recognize when a fish has been hooked, and be able to readily remove the rod from the particular holder to land the fish.

With the above and related objects in view, this invention consists in the details of construction and combination of parts, as will be more fully understood from the following description, when read in conjunction with the accompanying drawing, in which:

FIG. 1 is an elevational view of the toggle-actuated automatic hook-setting fishing rod holder of this invention.

FIG. 2 is an enlarged detail view of the invention, also showing in dash outline the position of the toggle after it has moved beyond dead center to set the hook.

FIG. 3 is a sectional view on line 3—3 of FIG. 2.

FIG. 4 is a sectional view on line 4—4 of FIG. 2.

FIG. 5 is a sectional view on line 5—5 of FIG. 2.

FIG. 6 is a sectional view on line 6—6 of FIG. 5.

FIG. 7 is a fragmentary sectional view showing the toggle joint adjustable abutment means.

There is shown at 10 the toggle-actuated automatic hook-setting fishing rod holder of this invention, on which a fishing rod 12′ may be detachably secured. The holder 10 consists of a support post 12 having means at one end for supporting the post 12 in upright position. This supporting means as herein shown is a sharpened end 14 adapted to be forcibly inserted into the ground or bank 16 of the river 18 for supporting the holder in suitable fishing position. Obviously, the support post 12, instead of being inserted into the ground by its point 14, may be suitably secured in upright position by any other suitable means, such as by securing it to the upper end of any convenient upright post, or clamping it to the side of a fishing boat or the like.

As shown in FIG. 5, the support post 12 may be U-shaped in transverse cross section, and at its upper end, when mounted in supporting position, there is provided a pin 20 on which is pivoted one end of a fishing rod handle holding lever 22.

The lever 22 is provided with a pair of spaced apart clamping means 24, within which the handle 26 of the fishing rod 12′ may be readily secured. As shown in FIG. 6, the clamping means 24 consists of a pair of opposed spring clamp fingers 28, suitably secured as by a rivet 30 to the lever 22.

The other end of lever 22 is pivoted to a toggle joint 32 by a pivot pin 34 at one end of one toggle member 36, the other end of the other toggle member 38 being pivoted on a pivot pin 40 extending transversely through the support post 12 at a position intermediate of and below the upper end of the support post 12.

The toggle members 36 and 38 are hinged together by a pivot hinge pin 42, providing the toggle joint hinge junction.

As shown, the toggle member 38 is a generally longitudinal member in one plane, while the other toggle member 36 consists of two parallel pieces secured together in U-shaped formation by a bridging portion 44, with the ends of lever 22 and the other toggle member 38 extending between the parallel pieces of the toggle member 36 and held therein by the respective pivot pin 34 and toggle hinge pin 42.

Extending normal to or at right angles to the toggle member 36 from the toggle hinge pin end thereof is a leg 46, the leg 46, of course, consisting of two portions, one portion extending from each of the parallel portions of the toggle member 36.

A second bridge 48 is secured between the parallel portions of leg 46, and is provided with a pivot threaded aperture for receiving an adjusting screw 50 therethrough, a knurled head 52 being provided for threadedly adjusting the screw 50 through the threaded opening through the bridge 48. The end 54 of screw 50 as thus mounted, necessarily abuts against the adjacent edge 56 of the other toggle member 38 and, if desired, the portion of the edge of toggle member 38 against which the end 54 of screw 50 abuts, may be slightly notched or recessed. The position of the screw holding bridge 48 and the length of the screw 50 is such that the toggle joint 32 will be held in a stationary position when it is above or off center to the dead center position between pivot pins 34 and 40.

Adjustable biasing means 60 is provided between the extending end of leg 46 of toggle member 36 and a still lower portion of the support post 12. This biasing means 60 consists of a tension or coil spring 62 having one end hooked to a short length of chain 64 secured at 66 to an anchor pin through the end of the leg 46, and at its other end it is hooked to a longer length of chain 68. The tension of the spring 62 is adjusted by securing any selected link of 68 in a snap hook 70 extending about an anchor pin 72 which is secured transversely through the support post 12 at a position substantially below the toggle joint pivot pin 40 therethrough.

In operation, the support post 12 is secured in upright position in any convenient manner, as by driving the sharp end 14 into the ground 18 adjacent a fishing area 16. The toggle joint 32 is set in adjusted position against the abutment means above dead center as provided by the adjustable screw 50. The stationary position can, of course, be adjusted by setting the screw 50 in one direction or another and similarly, the biasing force of the bias means 60 can be adjusted by securing a selected link of chain 68 in the snap pin 70.

When the toggle joint 32 is above dead center in the position shown in FIG. 1, the biasing means 60 urges the toggle joint 32 in a direction upwardly of dead center, and into engagement with the abutment means, limiting further movement in that direction. The fishing rod 12', of conventional construction and provided with its usual baited hook, is secured in operative position by inserting its handle 26 into the securing clamps 24, with the baited end of the fishing line extending into the fishing area 16, the biasing means 60 and the abutment means at 50 having been suitably adjusted to provide the necessary tension and necessary position.

When a fish takes the hook in the fishing area 16, this exerts a downward action on the end of the fishing rod 12', causing it to pivot the lever 22 upwardly about the pivot pin 20, thereby causing the toggle joint hinge pin 42 to move from stationary position to a dead center position. When the toggle joint hinge pin 42 reaches dead center position, the biasing means 60 stops resisting the motion, and then assists the motion to go below dead center and accelerates the movement of the toggle joint below dead center, thereby whipping the end of the fishing rod 12' upwardly and, of course, causing the hook to set firmly in the fish which has struck the hook. Thereafter, as the fish may try to escape, the biasing means at 60 permits the lever 22 and the fishing rod 12' to pivot or play up and down about the lever pivot 20 to the post, thus playing the fish until the fisherman can take hold of the fishing rod 12', remove the handle 26 from the clamps 24 readily and easily, and then play the fish in the usual manner until he lands the fish.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A toggle-actuated automatic hook-setting fishing rod holder comprising a support post having means at one end for mounting it in upright position, a fishing rod supporting lever pivotally secured at one end to the upper end of said support post, means for detachably securing a fishing rod to said lever to extend upwardly over said support post, and a toggle joint pivoted at one toggle member end to the other end of said fishing rod lever and at its other toggle member end to an intermediate portion of said support post below its upper end, adjustable abutment means limiting the hinging movement of the toggle joint hinge junction to slightly above dead center in one direction to support said fishing rod lever in stationary position, said toggle hinge junction being urged toward dead center position by downward force exerted on the end of the fishing rod supported on said lever and extending over the upper end of said support post, and adjustable biasing means connecting said toggle joint hinge junction to a still lower portion of said support post, said biasing means resisting movement of said toggle joint hinge junction from stationary position toward dead center position and then accelerating said movement below dead center position to thereby whip up the end of the fishing rod on said lever and thereafter yieldably resisting playing of the fishing rod end.

2. The holder of claim 1, the toggle joint member pivoted to said lever having a leg extending normal thereto from its toggle joint hinge end, said normal leg extending toward and beyond dead center position when in stationary position, said biasing means being connected to the extended end of said normal leg.

3. The holder of claim 2, said adjustable abutment means comprising a screw threadedly mounted on said normal leg and having its end abut an edge of the other toggle joint member.

References Cited in the file of this patent

UNITED STATES PATENTS

| | | |
|---|---|---|
| 1,762,783 | Kascak | June 10, 1930 |
| 2,898,697 | Housman | Aug. 11, 1959 |